(12) United States Patent
Barlow et al.

(10) Patent No.: US 8,797,667 B1
(45) Date of Patent: Aug. 5, 2014

(54) DISK DRIVE CALIBRATING BIAS SIGNAL FOR TOUCHDOWN SENSOR

(71) Applicant: Western Digital Technologies, Inc., Irvine, CA (US)

(72) Inventors: Carl E. Barlow, Lake Forest, CA (US); Chun Sei Tsai, Tustin, CA (US); Thomas A. O'Dell, Sunnyvale, CA (US); David E. Fowler, San Jose, CA (US); David E. Wachenschwanz, Saratoga, CA (US); Balvinder Singh, Gilroy, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/652,239

(22) Filed: Oct. 15, 2012

(51) Int. Cl.
*G11B 5/60* (2006.01)

(52) U.S. Cl.
CPC .................................... *G11B 5/6076* (2013.01)
USPC .............................................. 360/55; 360/75

(58) Field of Classification Search
None
See application file for complete search history.

(56) References Cited

U.S. PATENT DOCUMENTS

| | | | |
|---|---|---|---|
| 5,450,747 A | 9/1995 | Flechsig et al. | |
| 5,666,237 A | 9/1997 | Lewis | |
| 5,790,334 A * | 8/1998 | Cunningham | 360/66 |
| 5,808,184 A | 9/1998 | Boutaghou et al. | |
| 5,825,181 A | 10/1998 | Schaenzer et al. | |
| 5,901,001 A | 5/1999 | Meyer et al. | |
| 6,004,030 A | 12/1999 | Abraham et al. | |
| 6,019,503 A | 2/2000 | Abraham et al. | |
| 6,130,793 A | 10/2000 | Ohmori et al. | |
| 6,175,457 B1 | 1/2001 | Flynn | |
| 6,262,858 B1 * | 7/2001 | Sugiyama et al. | 360/75 |
| 6,310,739 B1 | 10/2001 | McEwen et al. | |
| 6,311,551 B1 | 11/2001 | Boutaghou | |
| 6,494,085 B2 | 12/2002 | Wakefield et al. | |
| 6,504,662 B2 | 1/2003 | Sobey | |
| 6,556,366 B2 * | 4/2003 | Patti et al. | 360/66 |
| 6,608,728 B1 * | 8/2003 | Sugiyama | 360/66 |
| 6,724,550 B2 | 4/2004 | Teo et al. | |
| 6,751,039 B1 * | 6/2004 | Ngo et al. | 360/66 |
| 6,920,001 B2 | 7/2005 | Chua et al. | |
| 6,940,669 B2 | 9/2005 | Schaenzer et al. | |
| 7,027,263 B2 * | 4/2006 | Ottesen et al. | 360/69 |
| 7,097,110 B2 | 8/2006 | Sheperek et al. | |
| 7,271,967 B2 | 9/2007 | Shi et al. | |
| 7,595,948 B1 | 9/2009 | Oberg | |
| 7,760,458 B1 * | 7/2010 | Trinh | 360/66 |
| 7,804,657 B1 * | 9/2010 | Hogg et al. | 360/66 |
| 7,872,824 B1 * | 1/2011 | Macchioni et al. | 360/66 |
| 8,031,420 B2 | 10/2011 | Mathew et al. | |
| 8,045,283 B2 | 10/2011 | Yang et al. | |
| 8,259,406 B2 * | 9/2012 | Kazusawa et al. | 360/46 |
| 8,427,770 B1 | 4/2013 | O'Dell et al. | |
| 8,477,455 B2 * | 7/2013 | Furukawa et al. | 360/234.4 |
| 2003/0210486 A1 * | 11/2003 | Ottesen et al. | 360/75 |

(Continued)

*Primary Examiner* — Wayne Young
*Assistant Examiner* — James L Habermehl

(57) ABSTRACT

A disk drive is disclosed comprising a head actuated over a disk, the head comprising a touchdown sensor comprising a resistance. A bias signal is applied at a reference value to the touchdown sensor at a reference temperature, and a corresponding reference resistance of the touchdown sensor is measured. An operating value for the bias signal is generated based on a predetermined operating temperature of the touchdown sensor, the reference resistance, the reference temperature, and a thermal coefficient of resistance (TCR) of the touchdown sensor, wherein the TCR specifies a change in temperature of the touchdown sensor relative to a change in the resistance of the touchdown sensor.

18 Claims, 2 Drawing Sheets

(56) References Cited

U.S. PATENT DOCUMENTS

| | | |
|---|---|---|
| 2011/0157736 A1* | 6/2011 | Contreras et al. ............... 360/31 |
| 2012/0120982 A1* | 5/2012 | Anaya-Dufresne et al. .. 374/141 |
| 2012/0158349 A1* | 6/2012 | Lee et al. ...................... 702/130 |
| 2013/0083430 A1* | 4/2013 | Chiu et al. ................. 360/234.3 |
| 2013/0163110 A1* | 6/2013 | Garzon et al. .................. 360/75 |

* cited by examiner

DISK DRIVE CALIBRATING BIAS SIGNAL FOR TOUCHDOWN SENSOR

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk. The head may be fabricated with a suitable touchdown sensor, such as a suitable magnetoresistive sensor, which may be used to detect defects on the disk, such as thermal asperities.

DETAILED DESCRIPTION

Figure 1:
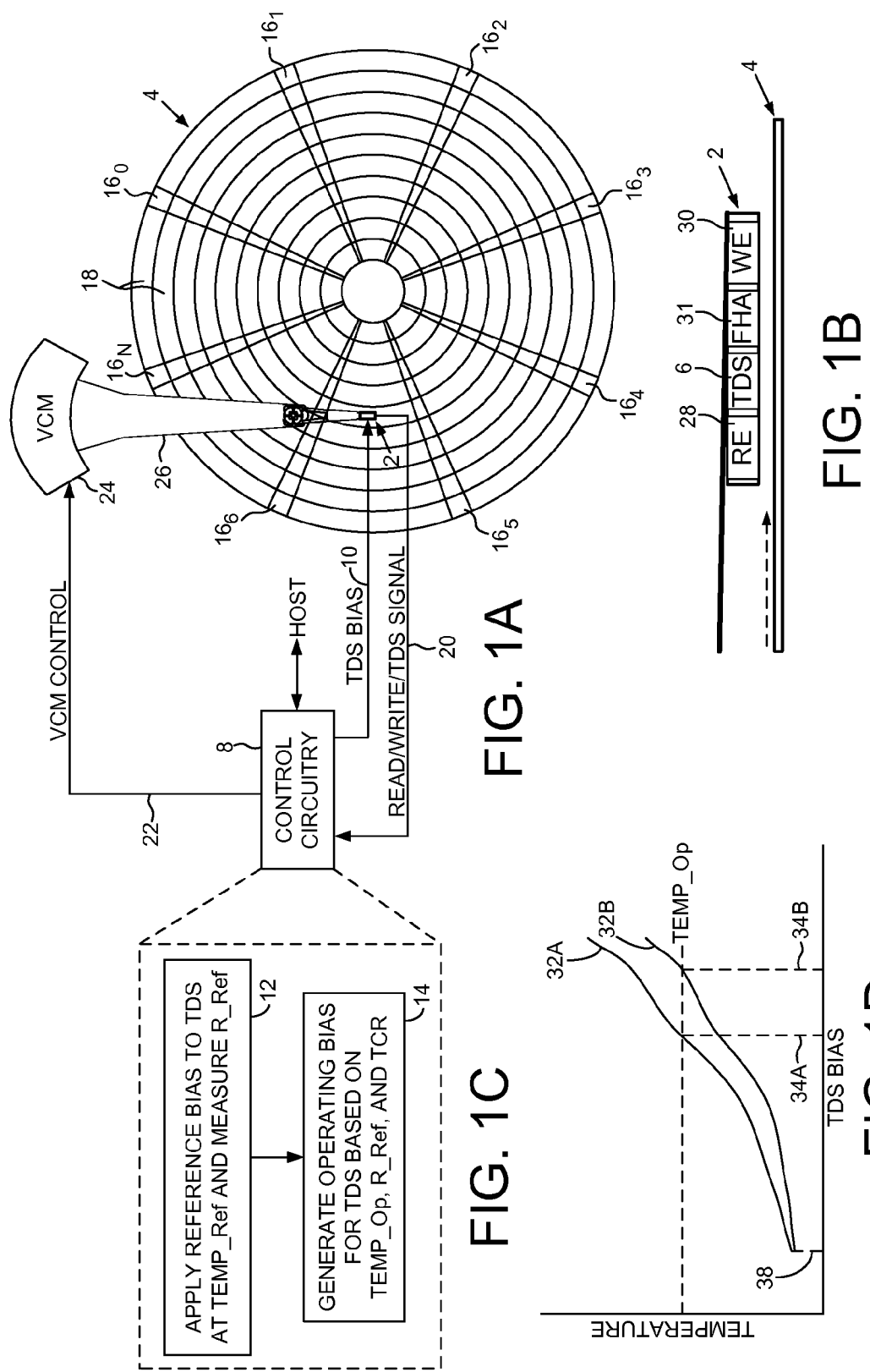
FIG. 1A shows a disk drive according to an embodiment of the present invention comprising a head actuated over a disk.
FIG. 1B shows an embodiment of the present invention wherein the head comprises a touchdown sensor comprising a resistance.
FIG. 1C is a flow diagram according to an embodiment of the present invention wherein an operating value for a bias signal applied to the touchdown sensor is generated based on a predetermined operating temperature of the touchdown sensor, a reference resistance of the touchdown sensor, a reference temperature of the touchdown sensor, and a thermal coefficient of resistance (TCR) of the touchdown sensor.
FIG. 1D illustrates an embodiment of the present invention wherein the operating value for the bias signal applied to the touchdown sensor to achieve the target operating temperature may vary due, for example, to differences in geometry of the touchdown sensor or a fly height control signal applied to a fly height actuator.

FIG. 1A shows a disk drive according to an embodiment of the present invention comprising a head 2 actuated over a disk 4, wherein the head 2 comprises a touchdown sensor 6 comprising a resistance (FIG. 1B). The disk drive further comprises control circuitry 8 operable to execute the flow diagram of FIG. 1C. A bias signal 10 is applied at a reference value to the touchdown sensor 6 at a reference temperature and a corresponding reference resistance of the touchdown sensor is measured (block 12). An operating value for the bias signal 10 is generated based on a predetermined operating temperature of the touchdown sensor 6, the reference resistance, the reference temperature, and a thermal coefficient of resistance (TCR) of the touchdown sensor 6 (block 14), wherein the TCR specifies a change in temperature of the touchdown sensor 6 relative to a change in the resistance of the touchdown sensor 6.

In the embodiment of FIG. 1A, the disk 4 comprises embedded servo sectors $16_0$-$16_N$ that define a plurality of servo tracks 18. The control circuitry 8 processes a read signal 20 emanating from the head 2 to demodulate the servo sectors $16_0$-$16_N$ and generate a position error signal (PES) representing an error between the actual position of the head and a target position relative to a target track. The control circuitry 8 filters the PES using a suitable compensation filter to generate a control signal 22 applied to a voice coil motor (VCM) 24 which rotates an actuator arm 26 about a pivot in order to actuate the head 2 radially over the disk in a direction that reduces the PES. The servo sectors $16_0$-$16_N$ may comprise any suitable position information, such as a track address for coarse positioning and servo bursts for fine positioning. The servo bursts may comprise any suitable pattern, such as the amplitude-based servo pattern, or a suitable phase-based servo pattern.

In the embodiment of FIG. 1B, the head 2 comprises a suitable read element 28 and a write element 30. The head 2 may also comprise a suitable fly height actuator 31, such as a suitable heater that controls the fly height of the head 2 over the disk 4 through thermal expansion. In one embodiment, a fly height control signal is applied to the fly height actuator 31 to maintain a target fly height of the head 2 while scanning for defects on the disk using the touchdown sensor 6. Any suitable defects may be detected, such as asperities or recesses on the disk, wherein in one embodiment the defect causes a corresponding thermal response of the touchdown sensor 6.

In one embodiment, the bias signal 10 is applied to the touchdown sensor 6 in order to achieve a desired sensitivity during the defect scan operation. Any suitable touchdown sensor 6 may be employed in the embodiments of the present invention, such as a magnetoresistive sensor that exhibits a change in resistance relative to temperature. Since a defect on the disk 4 induces a temperature change in the touchdown sensor 6, in one embodiment the resulting change in resistance can be transduced into a defect detection signal, such as by measuring a change in current flowing through the touchdown sensor 6 while applying a constant voltage across the touchdown sensor 6.

In one embodiment, the touchdown sensor 6 is fabricated with a thermoresistive material having a thermal coefficient of resistance (TCR) that specifies the change in temperature relative to a change in the resistance of the material. In one embodiment the bias signal 10 applied to the touchdown sensor 6 will raise the temperature of the thermoresistive material (with a corresponding change in resistance); however, the degree to which the temperature of the touchdown sensor 6 rises depends on its geometry which varies due to tolerances in the fabrication process. For a particular setting of the bias signal 10, a larger (or thicker) touchdown sensor 6 may exhibit a lower temperature response (and corresponding resistance response) as compared to a smaller (or thinner) touchdown sensor 6. In addition, if a fly height actuator is employed to achieve a target fly height during the defect scan, the fly height control signal may vary from drive to drive due to various manufacturing tolerances, such as tolerances in the geometry of the head, the fly height actuator, the head gimbal assembly, etc. In one embodiment, the heating of the fly height actuator may affect the temperature of the touchdown sensor 6, and therefore may affect the behavior of the touchdown sensor 6 for a given value of the bias signal 10. In one embodiment, in order to achieve a consistent performance for the defect scan operation (accurately detect true defects and minimizes false detections) across a family of disk drives, an operating value for the bias signal 10 is calibrated so as to achieve a target operating temperature for each touchdown sensor 6, thereby compensating for the differences in behavior. That is, with each touchdown sensor 6 biased to achieve a target operating temperature (and corresponding bias resistance), the response to the defects on the disk will be relatively consistent across the disk drives.

This embodiment is illustrated in FIG. 1D which plots two curves 32A and 32B representing the temperature vs bias setting for two touchdown sensors exhibiting different responses due, for example, to different geometries and/or different fly height control signals applied to a fly height actuator. The bias signal 10 is calibrated to operating value value 34A for the first touchdown sensor having the response curve 32A, and the bias signal 10 is calibrated to operating value 34B for the second touchdown sensor having the response curve 32B. In this manner, both touchdown sensors operate at the target operating temperature (TEMP_Op) during the defect scan operation.

Figure 2:
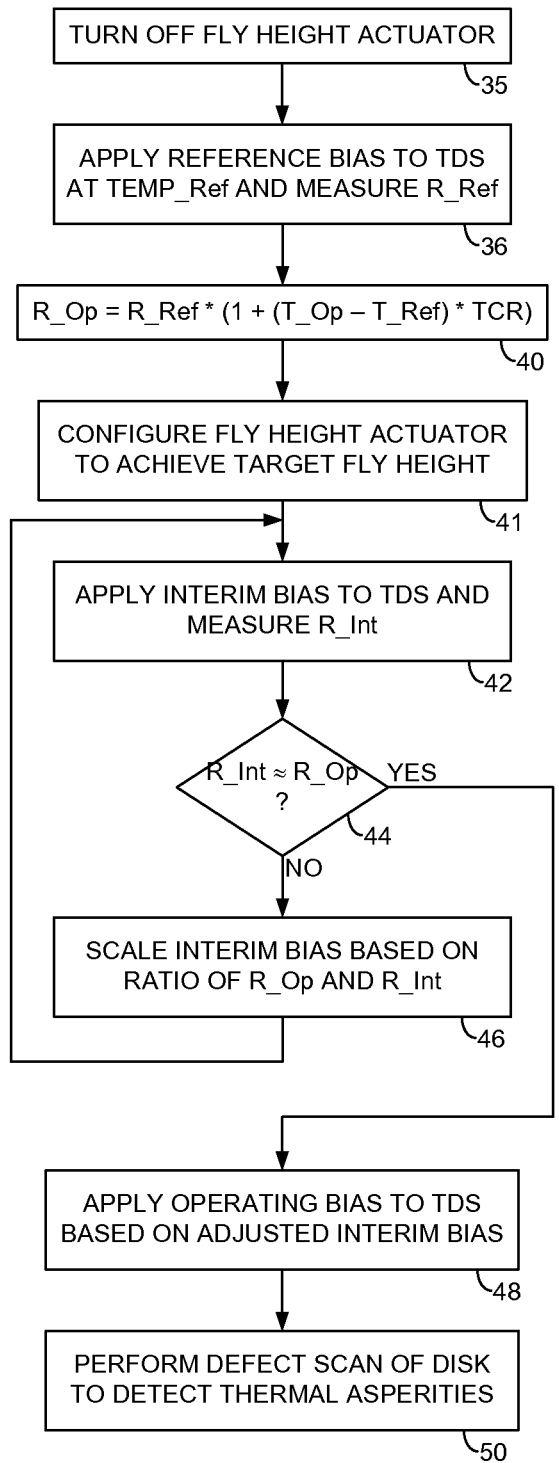
FIG. 2 is a flow diagram according to an embodiment of the present invention for calibrating the operating value for the bias signal applied to the touchdown sensor prior to performing a defect scan of the disk.

FIG. 2 is a flow diagram according to an embodiment of the present invention for calibrating the bias signal 10 applied to the touchdown sensor 6. The fly height control signal is initially configured to substantially zero (block 35) so that the temperature of the touchdown sensor 6 is affected mainly by the ambient temperature rather than by the fly height actuator. The bias signal 10 is applied to the touchdown sensor 6 at a reference value while operating at a known reference temperature, and a reference resistance of the touchdown sensor 6 is measured (block 36). In one embodiment, the disk drive is operated in a temperature controlled environment, and therefore the reference temperature is transmitted or programmed into the control circuitry 8. In another embodiment, the disk drive comprises a suitable temperature sensor for measuring the reference temperature when executing the calibration procedure. The reference resistance of the touchdown sensor 6 may be measured in any suitable manner, such as by measuring the current flowing through the touchdown sensor 6 while applying a known voltage across the touchdown sensor 6. In one embodiment, the reference value for the bias signal 10 is selected as the minimum value out of a plurality of values (such as value 38 in FIG. 1D).

After measuring the reference resistance, in one embodiment an operating resistance of the touchdown sensor 6 is estimated according to (block 40):

$$R\_Op = R\_Ref*(1+(T\_Op-T\_Ref)*TCR)$$

where:
R_Ref is the reference resistance of the touchdown sensor;
T_Ref is the reference temperature of the touchdown sensor;
R_Op is the operating resistance of the touchdown sensor; and
T_Op is the predetermined operating temperature of the touchdown sensor.

After estimating the operating resistance of the touchdown sensor 6, the fly height control signal is configured to achieve a target fly height (block 41), and a loop is executed in order to identify the operating value for the bias signal 10 that will achieve the operating resistance at the predetermined operating temperature (which takes into account the heating effect of the fly height actuator). The bias signal 10 is applied to the touchdown sensor 6 at an interim value and a corresponding interim resistance of the touchdown sensor is measured (block 42). If the interim resistance does not match the operating resistance (block 44), the interim value for the touchdown signal 10 is scaled based on a ratio of the operating resistance to the measured interim resistance (block 46). The flow diagram is then repeated starting at block 42 until the measured interim resistance substantially matches the operating resistance (block 44). The operating value for the bias signal 10 is then selected based on the ending interim value (block 48), such as by setting the operating value equal to the ending interim value or by adding or subtracting a predetermined offset. The defect scan of the disk is then executed using the calibrated operating value for the bias signal 10 in order to detect defects on the disk, such as thermal asperities (block 50).

The bias signal 10 applied to the touchdown sensor 6 may comprise any suitable signal, such as a current or a voltage, or a combination of a current and a voltage. In addition, the bias signal 10 may be generated as a constant (DC) signal, or as an alternating (AC) signal, or as a combination of a DC signal plus an AC signal. In one embodiment, the control circuitry 8 comprises a suitable digital-to-analog converter (DAC) operable to convert a digital value into an analog bias signal 10 applied to the touchdown sensor 6.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a disk;
a head actuated over the disk, the head comprising a touchdown sensor comprising a resistance;
a fly height actuator; and
control circuitry operable to:
apply a fly height control signal to the fly height actuator to control a fly height of the head;
configure the fly height control signal to substantially zero and apply a bias signal at a reference value to the touchdown sensor at a reference temperature and measure a corresponding reference resistance of the touchdown sensor;
estimate an operating resistance of the touchdown sensor at a predetermined operating temperature of the touchdown sensor based on the reference resistance, the reference temperature, and a thermal coefficient of resistance (TCR) of the touchdown sensor, wherein the TCR specifies a change in temperature of the touchdown sensor relative to a change in the resistance of the touchdown sensor; and configure the fly height control signal to achieve a target fly height of the head and generate an operating value for the bias signal by adjusting the bias signal until a measured interim resistance of the touchdown sensor substantially equals the operating resistance.

2. The disk drive as recited in claim 1, wherein the resistance of the touchdown sensor changes relative to an amplitude of the bias signal.

3. The disk drive as recited in claim 1, wherein the reference value for the bias signal comprises a minimum value out of a plurality of values.

4. The disk drive as recited in claim 1, wherein the reference temperature comprises an ambient temperature of the disk drive.

5. The disk drive as recited in claim 1, wherein the operating value for the bias signal depends on a geometry of the touchdown sensor.

6. The disk drive as recited in claim 1, wherein the control circuitry is operable to estimate the operating resistance of the touchdown sensor according to:

$$R\_Op = R\_Ref*(1+(T\_Op-T\_Ref)*TCR)$$

where:
R_Ref is the reference resistance of the touchdown sensor;
T_Ref is the reference temperature of the touchdown sensor;
R_Op is the operating resistance of the touchdown sensor; and
T_Op is the predetermined operating temperature of the touchdown sensor.

7. The disk drive as recited in claim 1, wherein the control circuitry is operable to generate the operating value for the bias signal by:
applying the bias signal at an interim value to the touchdown sensor and measuring the corresponding interim resistance of the touchdown sensor;
scaling the interim value based on a ratio of the operating resistance and the interim resistance; and
applying the bias signal at the scaled interim value to the touchdown sensor.

8. The disk drive as recited in claim 1, wherein the operating value for the bias signal depends on the fly height control signal that achieves the target fly height.

9. The disk drive as recited in claim 1, wherein the control circuitry is further operable to apply the bias signal at the operating value to the touchdown sensor and detect a thermal asperity on the disk in response to the touchdown sensor.

10. A method of operating a disk drive, the disk drive comprising a head actuated over a disk, the head comprising a touchdown sensor comprising a resistance, the method comprising:
applying a fly height control signal to a fly height actuator to control a fly height of the head;
configuring the fly height control signal to substantially zero and applying a bias signal at a reference value to the touchdown sensor at a reference temperature and measuring a corresponding reference resistance of the touchdown sensor; and
estimating an operating resistance of the touchdown sensor at a predetermined operating temperature of the touchdown sensor based on the reference resistance, the reference temperature, and a thermal coefficient of resistance (TCR) of the touchdown sensor, wherein the TCR specifies a change in temperature of the touchdown sensor relative to a change in the resistance of the touchdown sensor; and
configuring the fly height control signal to achieve a target fly height of the head and generating an operating value for the bias signal by adjusting the bias signal until a measured interim resistance of the touchdown sensor substantially equals the operating resistance.

11. The method as recited in claim 10, wherein the resistance of the touchdown sensor changes relative to an amplitude of the bias signal.

12. The method as recited in claim 10, wherein the reference value for the bias signal comprises a minimum value out of a plurality of values.

13. The method as recited in claim 10, wherein the reference temperature comprises an ambient temperature of the disk drive.

14. The method as recited in claim 10, wherein the operating value for the bias signal depends on a geometry of the touchdown sensor.

15. The method as recited in claim 10, further comprising estimating the operating resistance of the touchdown sensor according to:

$$R\_Op = R\_Ref*(1+(T\_Op-T\_Ref)*TCR)$$

where:
R_Ref is the reference resistance of the touchdown sensor;
T_Ref is the reference temperature of the touchdown sensor;
R_Op is the operating resistance of the touchdown sensor; and
T_Op is the predetermined operating temperature of the touchdown sensor.

16. The method as recited in claim 10, further comprising generating the operating value for the bias signal by:
applying the bias signal at an interim value to the touchdown sensor and measuring the corresponding interim resistance of the touchdown sensor;
scaling the interim value based on a ratio of the operating resistance and the interim resistance; and
applying the bias signal at the scaled interim value to the touchdown sensor.

17. The method as recited in claim 10, wherein the operating value for the bias signal depends on the fly height control signal that achieves the target fly height.

18. The method as recited in claim 10, further comprising applying the bias signal at the operating value to the touchdown sensor and detect a thermal asperity on the disk in response to the touchdown sensor.

* * * * *